(Model.) 2 Sheets—Sheet 1.

H. F. BATCHELLER.
Churn.

No. 243,350. Patented June 28, 1881.

WITNESSES:
Jn? Cushing.
Cyrus Kehr

INVENTOR:
H. F. Batcheller (Model.)

H. F. BATCHELLER.
Churn.

No. 243,350.

2 Sheets—Sheet 2.

Patented June 28, 1881.

Witnesses:
Cyrus Nehr
Belle Manahan

Inventor:
Henry F. Batcheller
By Manahan & Ward
his Attys

UNITED STATES PATENT OFFICE.

HENRY F. BATCHELLER, OF ROCK FALLS, ILLINOIS.

CHURN.

SPECIFICATION forming part of Letters Patent No. 243,350, dated June 28, 1881.

Application filed January 10, 1881. (Model.)

*To all whom it may concern:*

Be it known that I, HENRY F. BATCHELLER, of the village of Rock Falls, in the county of Whiteside and State of Illinois, have invented certain new and useful Improvements in Churns; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention pertains to that class of barrel-churns which are furnished with trunnions midway upon their opposite sides, and in which the operation of churning is performed by revolving the churn endwise, such trunnions serving as an axis.

My invention has special reference to certain improvements in securing the lid of the churn, so as to prevent the escape of any part of the cream.

As the shape and mode of use of such churns are well known in the art I do not deem it necessary to exhibit more than the parts embodying my improvement and their relation to the other parts of the churn.

Figure 3:
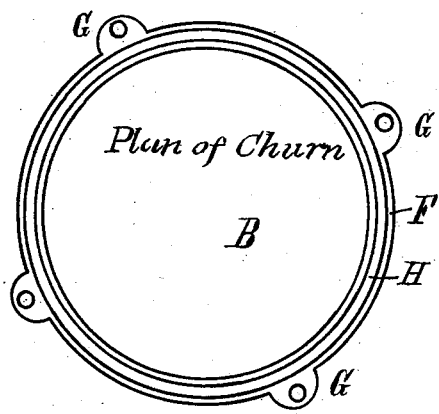
Figure 2:
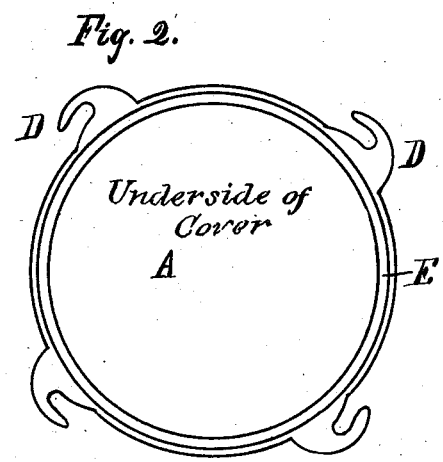
Figure 1:
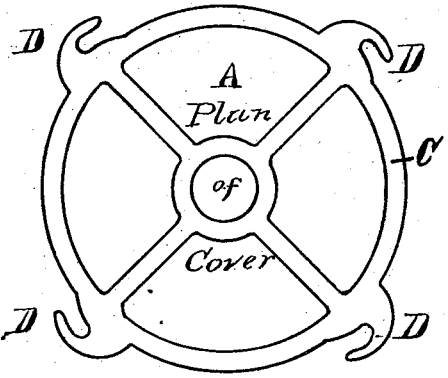
Figure 4:
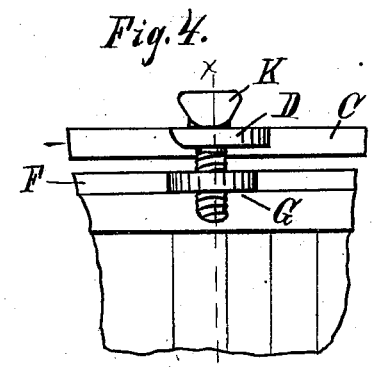
Figure 5:
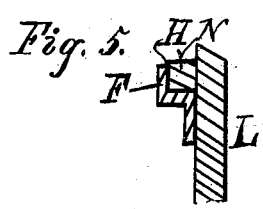
Figure 6:
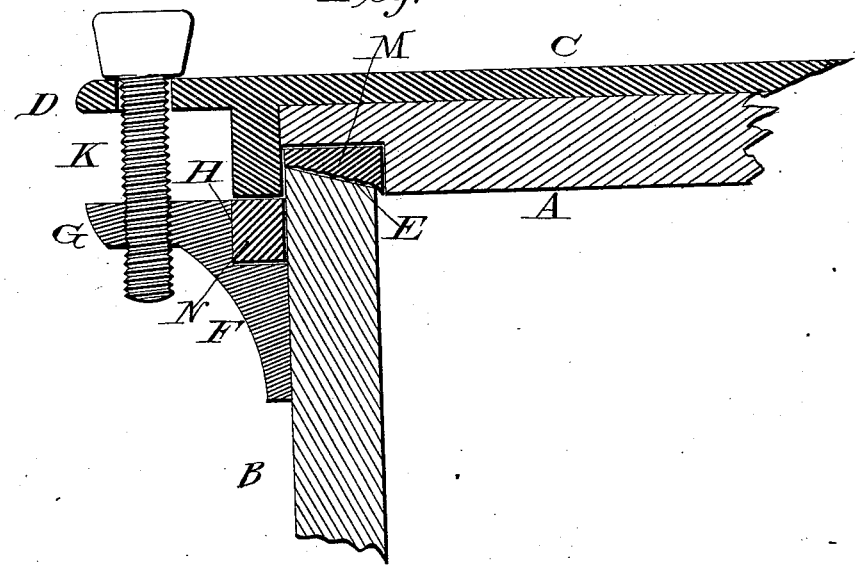

In the drawings, Figure 1 is a view of the upper side of the lid of a churn having my improvement. Fig. 2 is the under side of such lid. Fig. 3 is a plan view of the top of the churn with the lid removed. Fig. 4 is a side elevation of a section of the upper end of the churn with the lid in position, showing the mode of fastening. Fig. 5 is a vertical cross-section of the upper end of the churn, showing the relative position of the staves, rim, and elastic packing. Fig. 6 is a vertical section on the line *x x*, Fig. 4.

The chief difficulty heretofore in such churns has been to fasten the lid thereon so that it would be removable at will for the purpose of putting in the cream and taking out the butter and buttermilk when the churning was accomplished, and yet be sufficiently tight to prevent the escape of any of the cream when the latter should be dashed against the under side of the lid as the churn was revolved endwise in the process of churning.

The churns have been preferably made of staves, and when not in use the upper ends of the staves would shrink as they dried, leaving intervening cracks through which the cream would escape until, through moisture from the cream, the staves would again swell tight, to again shrink and leak when dry. It has been attempted to obviate this by setting an iron band around the inside of the churn a short distance from the top, and fitting the lid in the mouth of the churn down upon this band or rim; but the latter was objectionable, in that it was in the way in the removal of the butter and buttermilk and rendered it more difficult to keep the churn clean, as the rim formed a recess for the lodgment of the particles of butter and milk. Some have attempted to avoid the difficulty mentioned by placing a metallic hoop around the upper end of the churn flush with the ends of the staves; but while this prevented much swelling of the latter from moisture it furnished no remedy for the shrinkage of the ends of the staves.

In my invention which I am about to describe I believe I have obviated the aforesaid difficulty and provided a lid which is perfectly tight under all circumstances, and is yet readily removed and replaced.

A is the wooden lid of the churn, which has affixed thereto, on its upper side, the iron frame C, which frame has formed on its periphery the four horizontal equidistant flat-sided hooks D. The outer edge of the frame C extends down over and incloses the wooden portion of the lid, the lower edge of the frame C being on the same plane with the lower face of the wooden lid A, to which such frame is attached. An annular recess, E, is cut in the lower side of the wooden lid A, next to the edge of the frame C, and this recess is filled with cork, rubber, or other elastic material, M, as shown in Fig. 2. The purpose of this filling is to receive the upper end of the staves of the churn, the ends of the staves partially penetrating or embedding themselves in such elastic filling.

In Fig. 3 the inner annular space corresponds to the upper end of the churn-staves L.

F is a metallic hoop encircling the upper end of the churn B, and having integral therewith the four equidistant fixed threaded nuts G. The metallic hoop F is so placed in relation to the upper end of the churn B that the upper ends of the churn-staves L project above the hoop F, as shown in Fig. 5, the distance they will embed themselves in the elastic filling in the recess E of the lid A. In the inner upper surface of the hoop F is formed the annular recess H, and the recess H is filled to a level with the upper plane of the hoop F with cork, rubber, or other elastic substance, N. The purpose and advantage of this filling is that it yields to the expansion from moisture of the upper ends of the churn-staves, and when the latter shrink it follows them in. I prefer for such filling cork or some elastic substance which will hold moisture, as such filling, by supplying moisture to the ends of the staves, largely prevents the latter from shrinking in the intervals between churnings.

When the lid A is placed on the churn B the upper ends of the staves of the latter embed themselves in the elastic filling N of the recess E in such lid. The lid A is forced down and held in place by the thumb-screws K, which engage, respectively, the hooks D of the lid-frame C, and are screwed into the fixed nuts G of the hoop F, as shown in Fig. 4.

The advantage of the hooks D over simple holes in their place is that the lid A may be removed and replaced by slightly loosening the thumb-screws K, and without entirely removing such screws. This is done by loosening the thumb-screws K and slightly revolving the lid A toward the backs of the hooks D until the latter disengage the thumb-screws K, when the lid A can be lifted off. The operation is merely reversed in replacing the lid A.

The class of churns referred to herein have become very popular, from the fact that all of the cream is therein agitated equally; and in consideration of this, and that I have overcome the difficulties heretofore existing in their operation, I deem my invention of great practical importance.

What I claim as my invention, and desire to secure by Letters Patent of the United States, is—

1. The combination of the lid A, frame C, having the hooks D, the churn B, and the hoop F, provided with the nuts G, and having the recess H filled with the elastic substance N, substantially as shown, and for the purpose described.

2. The combination of the churn B, the hoop F, provided with fixed nuts G, and having the recess H filled with elastic material N, in combination with the lid A, having the recess E therein filled with elastic material M, and the frame C, having the hooks D, substantially as shown, and for the purpose mentioned.

3. As a means of preventing shrinkage in the upper ends of the staves of the churn B, the hoop F, provided with the annular recess H on its inner upper surface, such hoop F being placed near the upper ends of such staves, and such recess H being filled with an elastic moisture-containing material, N, from which moisture is imparted to the staves as the latter become dry, substantially as shown, and for the purpose aforesaid.

4. The hoop F, having the annular recess H therein, and being provided with the fixed nuts G, substantially as shown, and for the purpose described.

In testimony that I claim the foregoing I have hereunto set my hand this 1st day of January A. D. 1881.

HENRY F. BATCHELLER.

Witnesses:
   JNO. J. CUSHING,
   JAMES KELSEY.